Nov. 24, 1959  E. J. HAGDAHL ET AL  2,914,731
MAXIMUM DEMAND INDICATORS
Filed Aug. 22, 1956  3 Sheets-Sheet 1
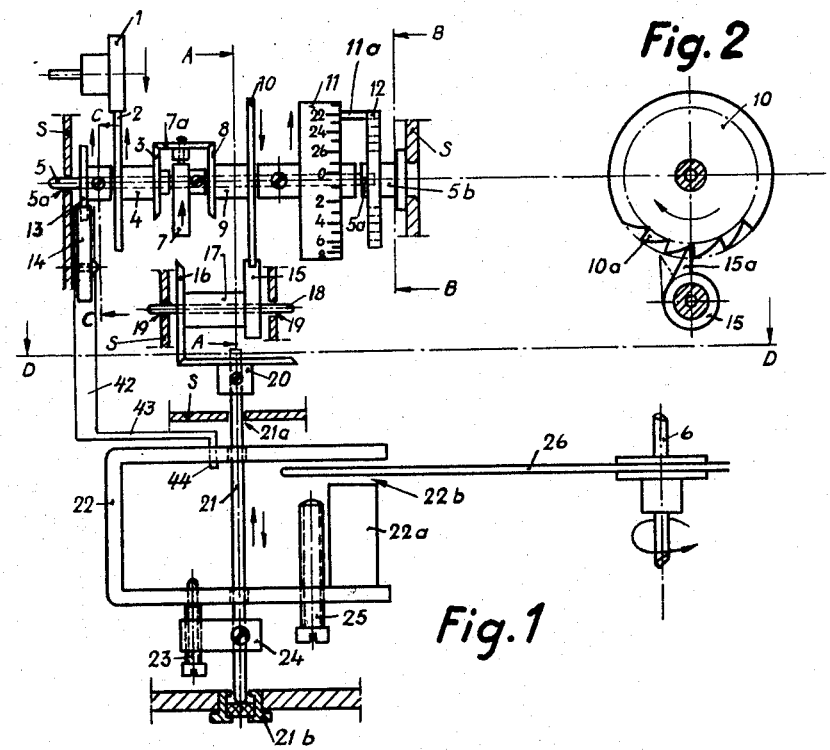
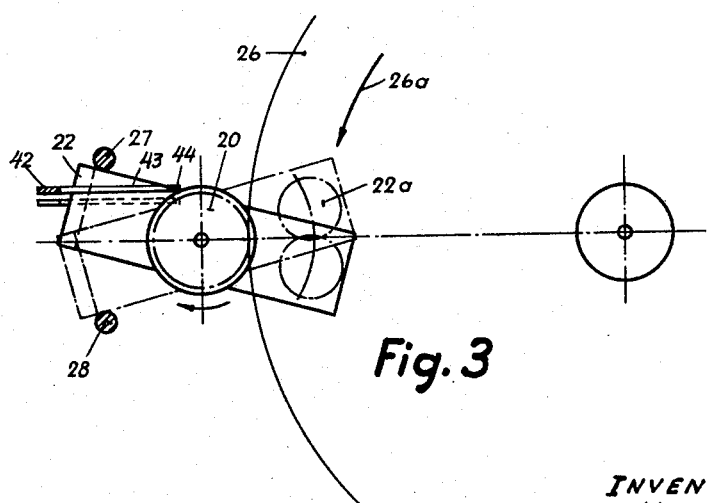
INVENTORS
ERNST JOHAN HAGDAHL
SVEN ERIC LINDBERG
By Hauer and Nydick
ATTORNEYS

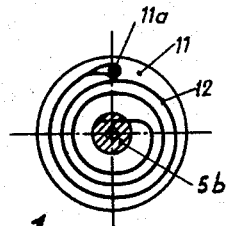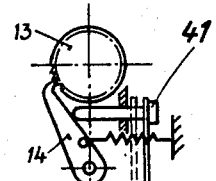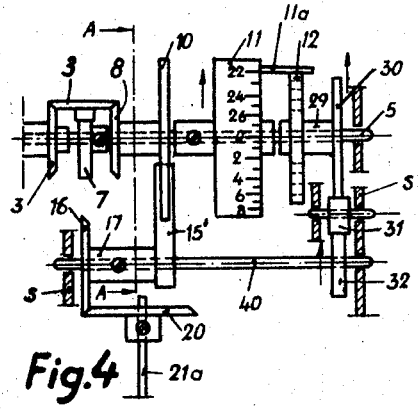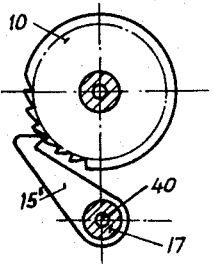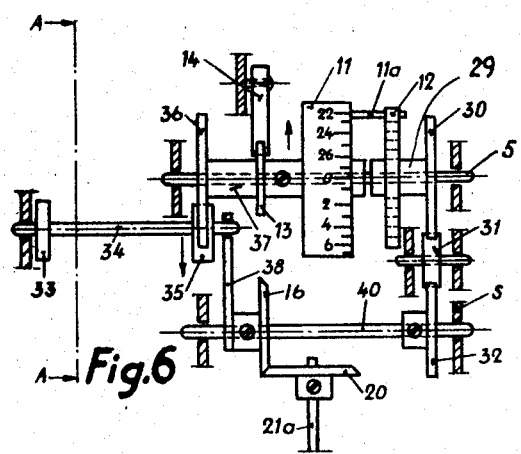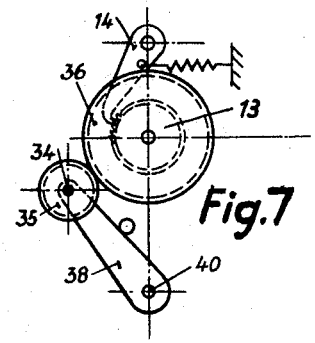

United States Patent Office 2,914,731
Patented Nov. 24, 1959

2,914,731

MAXIMUM DEMAND INDICATORS

Ernst Johan Hagdahl and Sven Erik Lindberg, Bromma, Sweden, assignors to Telefonaktiebolaget L M Ericsson, Stockholm, Sweden, a corporation of Sweden Application August 22, 1956, Serial No. 605,565

Claims priority, application Sweden September 8, 1955

6 Claims. (Cl. 324—103)

This invention relates to maximum demand indicators. It is an object of this invention to produce a device for indicating the maximum value of a magnitude varying with time, which magnitude may be represented by the number of revolutions of a revolving part, such as a rotor or an axle. The quantity measured may for instance consist of the electrical power in an electric meter, or of liquid quantity per unit of time in liquid meters, or the magnitude may be velocity, e.g. for speed indicators for vehicles.

In such meters intended for electric current the maximum average value of the power is registered during a definite time interval, the so-called registering period, and these meters are provided with a device—built in or separate—which determines the length of the registering period, said device receiving time-determined impulses from a switching clock, a synchronous motor or a thermally operated device. Meters constructed according to this principle are, due to their complicated construction, expensive and in need of a frequent overhaul. An element in the meter should after each period of registration (commonly 15 minutes) be restored to its zero position, which involves a great wear and tear.

This invention relates to a maximum demand indicator of a simplified design, in which no switching clock, or the like, is needed for emitting impulses to the maximum counting apparatus. The invention also discloses other advantages which are evident from the following description.

Figure 8:
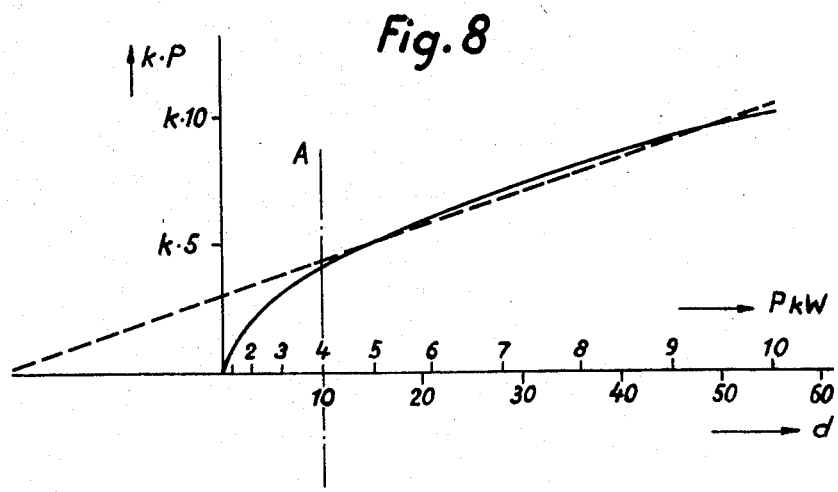
Figure 9:
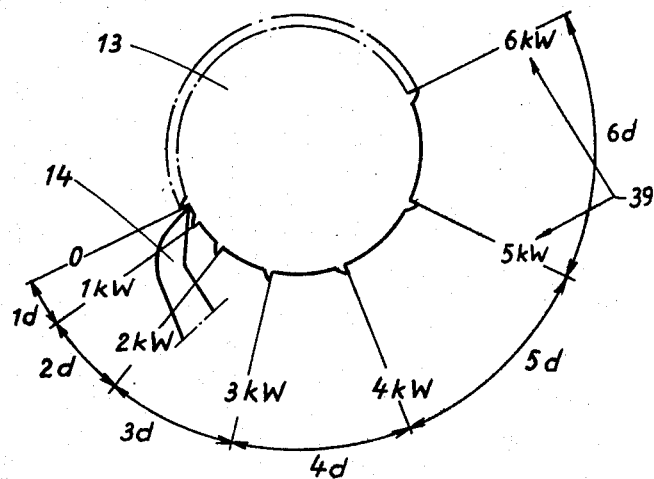

The invention will first be described as applied to electric meters with reference to the annexed drawings, which show three different embodiments. Fig. 1 shows the device seen from the side, Figs. 1a and 1b are sections taken along the line B—B and C—C, respectively, in Fig. 1. Fig. 2 is a section taken along the line A—A in Fig. 1. Fig. 3 is a section taken along the line D—D in Fig. 1. Figs. 4 and 6 are side-views of modifications, certain details, identical with those shown in Fig. 1, having been omitted. Fig. 5 is a section taken along the line A—A in Fig. 4 and Fig. 7 is a section along the line A—A in Fig. 6. Fig. 8 is a curve showing the spring-tension of the spring, which operates the indicating member, as a function of the load on the meter and Fig. 9 shows the pitch on a ratchet wheel.

In the figures, 1 indicates a gear wheel which is driven by suitable gearing (not shown) from the rotor axle 6 of the meter. The gear wheel 2 meshes with the wheel 1 and transmtis the motion of rotation to the sun wheel 3, which by means of the hub 4 is secured to the wheel 2. The assembly of elements 2, 3 and 4 form a unit, which rides freely on the axle 5 and which transmits the movement to the differential wheel 7a in the differential 3, 7a, 8. The wheel 7a is carried by the differential centre 7, which is secured to the axle 5, which axle is pivoted in the bearings 5a in the frame S of the meter, the right bearing shown in Fig. 1 being carried by a stud 5b inserted in the frame of the meter. The sun wheel 8 together with the hub 9 and the ratchet wheel 10 form a unit, which rides freely on the axle 5. To the axle 5 is also secured an indicating drum 11, which is urged to rotate by the force of a coil spring 12, said spring with its inner end being supported in the stud 5b (Fig. 1a) and with its outer end fixed to a journal 11a secured to the drum. The spring force tends to urge the drum to the position shown in Fig. 1 in which the digit "0" on the drum is intended to be located straight below a window in the casing of the meter, which window is not shown in the drawing and in which the position of the drum is indicated. In the now mentioned position of the drum 11 the spring 12 is not stressed. The ratchet wheel 13, shown to the left in Fig. 1, is secured to the axle 5 and is prevented from rotating in a counter clockwise direction by a pawl 4 (Fig. 1b). The toothing of the ratchet wheel 13 corresponds suitably to the graduation on the drum 11 so that by turning the wheel 13 a distance corresponding to one tooth, the drum 11 will be turned one increment.

In the frame S there is at 19 pivoted an axle 18, on which is freely mounted as a unit consisting of a ratchet wheel 15 provided with a ratchet tooth 15a, the hub 17 and the conical gear wheel 16, which latter meshes with the conical gear wheel 20, fixed to the revolving axle 21. When the axle is turned, the wheel 15 with the tooth 15a is turned.

A clamp 22 of ferromagnetic material is so connected with the axle 21, pivoted in the frame S at 21a and 21b, that when the clamp 22 is turned, the axle 21 will also be turned. This is brought about by an arm 24 screwed to the axle 21 and having a screw 23 threaded in one end of the arm 24. The free end of the screw 23 is inserted in a hole in the clamp 22, which latter is movable along the axle 21. By turning the screw 23 the clamp 22 may be moved along the axle 21. One leg of the clamp carries a permanent magnet 22a having an air gap 22b in which the rotor disc 26 of the meter revolves. An iron screw 25 is threaded in the clamp 22 and by screwing this screw in and out, respectively, the desired portion of the magnet flux from the magnet 22a may be shunted by the screw 25 to the clamp 22. The rotation of the clamp 22 is limited by the stop pins 27 and 28 (Fig. 3). When the rotor disc 26 rotates in the air gap 22b there arises on one hand a braking force on the disc and on the other hand a turning force on the clamp 22 with the magnet 22a. This turning force is proportional to the velocity of the rotor disc 26 and also to the power, with which the meter is loaded, and it may within certain limits be adjusted by changing the position of the screw 25. Since, as is mentioned above, the permanent magnet 22a applies a certain brake moment to the rotor disc, the brake moment from the normal brake magnet of the meter must be made smaller in a corresponding degree. Suitably the meter is dimensioned so, that the brake moment from the magnet 22a represents about 10–20% of the total brake moment which is needed to make the rotor disc obtain the right velocity.

The described device functions in the following manner:

On rotation of the rotor disc 26 in the direction of the arrow 26a (Fig. 3) there arises, according to the above, in the air gap 22b a force which drives the clamp 22 (clockwise in Fig. 3) until it is stopped by the stop pin 27. This motion of rotation is transmitted by the axle 21 and the conical gear wheels 20 and 16 to the ratchet wheel 15, so that this will occupy the position shown by full line in Fig. 2, said ratchet wheel having the point of tooth 15a directed towards the centre of the ratchet wheel 10. The motion of rotation of the rotor of the meter is transmitted also over the tooth gears 1 and 2 and the sun wheel 3 to the planet wheel 7a and via the sun wheel 8 to the ratchet wheel 10. The arrows in the figures, located at the different wheels, show the direction of rotation of the respective wheel, the arrows being supposed to be located on that cylindrical surface of the respective wheel, which is turned towards the spectator. An arrow turned upwards means for instance that said wheel, seen from the right in Fig. 1, rotates clockwise. The ratchet wheel 10 is prevented from being turned by the ratchet wheel 15. The differential centre 7 will thus be turned in the direction of the arrow and the indicating drum 11 and the ratchet wheel 13, which are screwed to the same axle 5 as said differential centre, will also be turned in the direction of the arrows. Thus the spring 12 is stretched sufficiently to provide the tension needed to rotate the indicating drum 11 and the ratchet wheel 13 around the differential center 7. The force which is necessary for the turning comes from the meter over the sun wheel 3 and is transmitted by the planet wheel 7a and the sun wheel 8 to the ratchet wheel 10, the pressure of which latter against the point 15a of the ratchet wheel 15 is increasing correspondingly increased as the spring 12 is stretched.

The device is now so dimensioned that, if the meter is loaded with for instance 10 kw. and the indicating drum 11 has been turned so, that the digit 10 is located straight below the window mentioned previously, the tension of the spring 12 is so great and thus the turning moment of the wheel 10 (in clockwise direction on Fig. 2) so great, that the ratchet tooth 15a by means of that tooth on the wheel 10, against which the tooth 15a bears is turned in a counterclockwise direction. The clamp 22 is also rotated towards the pin 28 an amount sufficient to cause the tooth of the wheel 10 to pass the point of the tooth 15a which is influenced by a turning moment arising from the clamp 22 (clockwise in Fig. 2) falling back against the next tooth on the wheel 10, after which this last mentioned tooth in its turn operates the ratchet tooth 15a. Thus the ratchet wheel 10, provided that the load is still 10 kw., will rotate slowly whereas the ratchet wheel 15 is turned to and fro, once for each tooth on the wheel 10, which passes the tooth 15a. As the wheel 10 with the sun wheel 8 now can rotate freely, the differential centre 7 with the indicating drum 11 cannot rotate, but the indicating drum 11 remains in the same position, 10 kw., and is retained in this position by the pawl 14 being in mesh with a tooth on the ratchet wheel 13. If the load on the meter decreases, the velocity of the rotor disc 26 will also decrease and the force tending to turn the clamp 22 against the stop pin 27 is reduced which causes the pressure from the tooth 15a against the teeth of the wheel 10 to be reduced to a lower amount than before. Therefore the ratchet wheel 10 is still able to rotate freely and the indicating drum remains in the same position as before, i.e. on the 10 kw.-marking.

If the load increases, for instance to 11 kw., the force in the clamp 22 increases in the rotary direction towards the stop pin 27 and the ratchet tooth 15a acts against the pressure from the ratchet wheel 10, said pressure still having the same value corresponding to the tension of the spring 12, when the drum indicates 10 kw., so that the indicating drum 11 is turned forward and the spring 12 is stretched still more. If the load decreases, before the indicating drum 11 and thus the ratchet wheel 13 have been brought forward one pitch, so that the ratchet pawl 14 cannot block up against the next tooth in wheel 13 (Fig. 1b), the drum 11 returns to the position "10 kw." If, on the other hand, the load 11 kw. is of sufficiently long duration, the indicating drum will be turned to the position 11 kw. and in this position the pawl 14 will engage before the next tooth on the ratchet wheel 13. If the load then continues to be 11 kw. or less, the tension from the spring 12 is so great, that the pressure from one tooth of the ratchet wheel 10 on the tooth 15a is greater than the pressure from tooth 15a on said tooth of the ratchet wheel 10, and therefore tooth 15a is brought aside and the ratchet wheel 10 is turned. Accordingly no turning of the differential centre 7 and of the drum 11 may take place and so the latter remains in the position 11 kw.

If the load changes from a lower value to a higher, the duration of that higher load value which is needed to make the indicating drum step forward one step, is dependent on the number of revolutions that the rotor disc has to revolve in order that the drum 11 and the ratchet wheel 13 may be turned forward one pitch and thus said duration is determined by the gear ratio between the rotor axle 6 and the ratchet wheel 13. If the ratchet wheel 13 has a constant pitch and one pitch on the ratchet wheel corresponds to one graduation on the indicating drum 11, each pitch will correspond to a certain number of kwh., independent of the magnitude of the load. For a three-phase meter, 380/220 v., 10 a., the gear ratio between the rotor axle 6 and the ratchet wheel 13 is suitably chosen so, that 1 kwh. corresponds to the movement of 1 pitch on the ratchet wheel 13 and the drum 11, respectively. The time required to bring the indicating drum 11 forward 1 step=1 pitch for 1 kwh. at an increase of the load of 1 kw. (corresponding to one so-called "registering period") will then be reciprocally proportional to the magnitude of the load; for said meter it is accordingly 1/10 h. at 10 kw., 1/20 h. at 20 kw. and so on. This construction gives an exact definition on the duration of a load in kw. which is necessary in order that said load may be registered and thanks to it, it is possible to obtain a good accuracy in all positions of the indicating drum 11 when using a common coil spring (12) having a rectilinear characteristic.

If instead it is desirable that the number of kwh., which is necessary for registering a change of 1 kw. in the load, should be proportional to the load, i.e. that the registering period (the interval during which a load change of 1 kw. can be registered) should be a definite time, independent of the load, the ratchet wheel 13 and the indicating drum 11 must be designed with rising pitches between the teeth 13 and increasing distances between the graduations on 11, respectively, with rising values on the registered load. That tooth of the ratchet wheel 13 which corresponds to 1 kw. should have its position at the pitch 1d from the zero position where "d" is the unit pitch distance (see Fig. 9 showing the pitch 1d, 2d, etc. on the ratchet wheel 13, the corresponding "kw." values on the indicating drum 11 also being indicated), the tooth corresponding to 2 kw. at 1+2=3 pitches from the zero position, the tooth corresponding to 10 kw. at 1+2+3+4+5+6+7+8+9+10=55 pitches from the zero position and so on, or generally the tooth corresponding to "n" kw. should have its position $$\frac{n}{2}$$

(n+1) pitches from the zero position. Between one tooth and a following on the ratchet wheel 13 there must consequently be as many pitches (one pitch=the space between the zero position and the first tooth) as the number of kw. which corresponds to the kw.-value on the indicating drum 11 for said following tooth. The spring 12 must then be made with a non-rectilinear characteristic or be replaced by another suitable spring-device. For example so that the tension of the spring for each position of the indicating drum is directly proportional to the value indicated in said position on the indicating drum. Thus the spring must give double as great a moment as at the position 1kw.=1 pitch, in order that the right tortional moment may be obtained on the ratchet wheel 10 at the position 2 kw.=3 pitches, and at the position 10 kw.=55 pitches the spring must give 10 times as great a moment as at 1 kw. and so on.

It is however possible, if the lower kw. values are omitted, which are of rather small interest, to use a normal coil spring having a rectilinear characteristic. In Fig. 8 the spring moment is plotted as ordinate and the load in kw. and the pitch on the ratchet wheel 13, respectively, as abscissae and the curve drawn in full line shows the characteristic that an ideal coil spring 12 should have in order that the graduation on the indicating drum 11 may be current right. If those values of the load are omitted which correspond to a lower (counting from zero position) number of pitches on the ratchet wheel 13 corresponding to the values which lie to the left of the line A in Fig. 8, and instead the spring 12 is given a characteristic which corresponds to the dotted straight line, a good approximation is obtained, where the rather small faults will concern the exactness of the power values. If the pitch of the ratchet wheel 13 and the indicating drum 11, respectively, is changed a little so that the spring moment always corresponds to the respective kw.-value on the drum 11, there will be small resulting errors in the registering period i.e., the latter will not be absolutely constant.

An alternative embodiment of the construction is shown in Figs. 4 and 5, with the parts not there shown being identical with those shown in Fig. 1. The inner end of the spring 12 is here fixed to the hub 29, which also carries the gear wheel 30 and which is free to rotate on the axle 5. By means of the gear wheels 31 and 32, said last mentioned wheel being fixed to the axle 40, the torsional moment of the spring 12 is transmitted to the pawl 15', fixed to the hub 17, which latter in its turn is screwed to the axle 40. A torsional moment being opposed to said moment from spring 12 is transmitted to the pawl 15' from the clamp 22 (the latter not shown in Fig. 4) over the gear wheels 20 and 16.

The design of the blocking element 15 differs in this embodiment from the earlier described construction and is evident from Fig. 5. When the torsional movement of the spring 12 on the pawl 15' is greater than the moment from the clamp 22, the pawl 15' is disengaged from the ratchet wheel 10 and no turning of the indicating drum 11 may take place, as the sun wheel 8 is then turned round on the axle 5 by the motion of rotation from the rotor of the meter over the differential wheel 3 and 7a. If the moment of the clamp 22 is greater than that of the spring 12, which occurs when the load on the meter is greater than the value shown by the indicating drum 11, the pawl 15' will be turned towards the ratchet wheel 10, so that this is blocked (the position shown in Fig. 5) and the motion of rotation of the rotor axle will then advance the indicating drum 11.

The remaining parts and mode of operation, including the connection between the pitch of the ratchet wheel 13 and the indicating drum 11, respectively, and the duration of the load, which is needed for registering the same on the indicating drum 11, are similar to those hereinbefore described.

Another alternative embodiment is shown in Figs. 6 and 7. The rotor 26 of the meter and the clamp 22 (not shown) correspond to what is shown in Fig. 1. The differential gear and the ratchet wheel 10, according to the embodiments described above, have here been replaced by a turnable gear wheel-coupling (34, 35, 36, 38). The motion of rotation from the rotor axle of the meter is transmitted to the gear wheel 33 in a manner not shown here and over the axle 34 and the gear wheels 35 and 36 and the hub 37 to the ratchet wheel 13 and the indicating drum 11. The wheels 36, 13 and the drum 11 are fixed to the hub 37, which is screwed to the axle 5. The right end of the axle 34 is pivoted in the arm 38, which is fixedly combined with the conical gear wheel 16, which in its turn is operated by the torsional moment of the clamp 22 over the wheels 20 and 16. The arm 38 is also operated by the moment from the spring 12 over the gear wheels 32, 31 and 30. When the torsional moment of the spring 12 on the arm 38 is heavier than the moment from the clamp 22, the arm 38 is turned in a counter clockwise direction in Fig. 7, so that the wheels 35 and 36 are disengaged from each other and no motion of rotation can be transmitted to the indicating drum 11 from the rotor disc of the meter. If the moment from the clamp 22 is heavier than the moment from the spring 12, which occurs when the load on the meter is greater than the value indicated by the indicating drum 11, the arm 38 is turned (clockwise in Fig. 7) so that the wheels 35 and 36 are brought to mesh with each other and the motion of rotation of the rotor axle then advances the indicating drum 11.

What has been said in connection with the embodiment according to Figs. 4 and 5 concerning the connection between the pitches of the tooth wheel 13 and the indicating drum 11 and the duration of the load etc. is also applicable to the embodiment last described.

The invention has been described above as applied to electric meters but it is not limited hereto. It may also be applied to other fields, as has been mentioned above, e.g. to speed indicators for motor cars or other vehicles. It is for example desirable that the top speed which has so long a duration that a certain specified length of road is covered, e.g. 300 m. at the least, should be registered. It is then possible to transmit the torsional moment of the car-wheels, or simply that of the mileometer to the wheel 1 and the axle 6, respectively, in Fig. 1 (e.g. by letting the rotor of the mileometer drive wheel 1 and axle 6, respectively) thus obtaining the speed registration on the drum 11. In case there is a constant pitch on the drum 11 and the ratchet wheel 13, each pitch will correspond to a certain determined length of road (e.g. 300 m.) independent of the speed of the motor car. The time (corresponding to the registering period) passing during the turning between two registering positions on the drum 11, will then be reciprocally proportional to the speed of the motor car. The drum is graduated in speed, e.g. km./h. If instead the ratchet wheel 13 and the drum 11 respectively, are designed with a rising pitch (as shown in Fig. 9) the distance between two consecutive teeth having rising velocity values will represent lengths of road, having successively rising length and the time passing between two successive registrations on the drum will then be constant and independent of the velocity.

The invention may also be used for measuring the maximum number of parts produced per time unit by a machine, i.e. one wants to measure the maximum capacity of the machine, provided that at this capacity a certain predetermined number of parts have been produced. The drum is then graduated in number of parts per time unit and the distance between two pitches represents the number of produced parts. It is for instance desirable that the drum should register the maximum number of parts per minute, provided that the corresponding capacity of the machine has so long a duration that a production of 100 parts is reached. If the drum shows that the capacity is 100 parts per minute and the capacity rises to 200 parts per minute, the digit 200 is not registered until 100 parts have been produced. The number of produced parts may in a known manner be converted into the motion of rotation, which is necessary for the device according to the invention, by means of a beam of light in the path of the produced parts, said beam lighting up a photoelectric cell which regulates the supply of current to for instance a synchronous motor acting as a meter, the number of revolutions of the rotor of the motor representing the number of parts produced per time unit. This motor may then drive the wheel 1 and the axle 6 in Fig. 1.

In all embodiments now described there is required a device to restore the apparatus to its zero position. In the embodiment shown in Figs. 1–3 and 6 and 7 this may take place by means of a push button 41, Fig. 1b, which, when being pressed, operates the arm 14, so that this will be turned in a counter clockwise direction and nullifies the blocking of the ratchet wheel 13. The spring 12 then endeavours to restore the ratchet wheel 13 and the drum 11 to the zero position, but as at the rotation of the meter the clamp 22 takes up the position shown with a full line in Fig. 3, the tooth 15a (Fig. 2) prevents rotation of the wheel 10 and a resetting to zero position is hereby prevented until the clamp 22 has been turned to the position indicated by dot and dash lines. This adjustment of the clamp 22 from the full-line position to dot and dash line position may take place by means of a push button, not shown in the drawing (similar to the one shown in Fig. 1b), which, counteracted by a spring, may be pressed and consequently turn the clamp 22, the ratchet tooth 15a thereby being turned (Fig. 2) to the dotted line position, in which the wheel 10 with the drum 11 by means of the spring 12 may be restored to its zero position. Suitably the last described push button and the button 41 are interconnected to a common operating device, so that only one member need be operated for the zero-setting.

As is more clearly shown in Figures 1, 1b, and 3, an arm having a vertical portion 42 and a horizontal portion 43 is secured to the push button 41 with the free end of the horizontal portion 43 having a flap 44 lying against the magnet 22. Thus, when the push button 41 is pushed inwardly, the arm 42, 44 is displaced, the flap 44 thereby operating the clamp 22, turning the same from the full line positions to the dot-dash line positions shown in Figure 3.

We claim:

1. Metering apparatus for registering the maximum value of a varying quantity comprising, in combination, a rotor responsive to the quantity to be measured and a rotatably mounted indicating member, a scale for said member, a spring connected to said indicating member urging said indicating member toward its zero position, ratchet means blocking said indicating member against rotation in a direction opposite to that in which said indicating member is driven by said rotor, a rotatably mounted magnet, said rotor being located within the influence of the magnetic field of the magnet, a torque thereby being exerted upon said magnet upon rotation of said rotor to turn said magnet, said ratchet means comprising a ratchet wheel and a turnable ratchet tooth mounted adjacent thereto, said ratchet tooth being operatively connected to said magnet so as to be turned upon rotation of said magnet toward blocking engagement with said ratchet wheel when said tooth is turned into a predetermined position, a differential gear connecting said rotor to said indicating member, said gear having one part connected to said rotor, a second part connected to said indicating member, and a third part connected to said ratchet wheel, to permit said indicating member to be moved away from its zero position by said rotor when said ratchet tooth is turned to said particular position and blocked against such movement when said ratchet tooth is turned away from said predetermined position.

2. Apparatus according to claim 1, further comprising an iron clamp having a first and a second leg, said magnet comprising a permanent magnet secured to said first leg, said rotor comprising a disc rotatably mounted between said permanent magnet and said second leg of said clamp, an iron screw threadingly supported upon said first leg, rotation of said screw effecting axial displacement thereof relative to said rotor disc for shunting a portion of the magnet flux coming from the permanent magnet, the size of said portion being controlled by the position of said screw which thus controls the magnitude of the torque acting on said magnet.

3. Apparatus according to claim 1, wherein said ratchet wheel includes teeth, said ratchet wheel being fixedly connected to said indicating member, a pawl associated with said ratchet wheel, and the angular tooth pitch of said ratchet wheel being the same as the angular graduation pitch on said scale.

4. Apparatus according to claim 3, wherein the tooth pitch on said ratchet wheel and the graduation pitch on said scale are constant.

5. Apparatus according to claim 3 wherein the teeth of the ratchet wheel and the graduation of said scale each have a pitch increasing in the turning direction in which said wheel and said indicating member is driven by said rotor, the graduation pitch on said scale between adjacent scale parts being such that the distance between the zero position and the value $n$ is $$\frac{n}{2}$$

$(n+1)$ scale parts, the tension in said spring operating said indicating member is directly proportional to the value indicated for each portion of said indicating member.

6. Apparatus according to claim 3 further comprising a support arm, a displaceable releasing member for disengaging said pawl from said ratchet wheel so as to release said wheel, said releasing member being mechanically connected with one end of said support arm, the other end of said support arm being arranged adjacent to said magnet for turning said magnet in response to operation of said releasing member.

References Cited in the file of this patent

UNITED STATES PATENTS

| | | |
|---|---|---|
| 1,138,786 | Porter | May 11, 1915 |
| 1,432,856 | Harris | Oct. 24, 1922 |
| 1,596,410 | Dorfman | Aug. 17, 1926 |